United States Patent [19]

Colacello et al.

[11] Patent Number: 4,561,874

[45] Date of Patent: Dec. 31, 1985

[54] METHOD FOR HEAT SEALING A GUN MOUNT IN A CRT NECK

[75] Inventors: Michael A. Colacello, Trenton; Emil V. Fitzke, West Windsor Township, Mercer County; Jack F. Otto, Ewing Township, Mercer County, all of N.J.

[73] Assignee: RCA Corporation, Princeton, N.J.

[21] Appl. No.: 648,809

[22] Filed: Sep. 10, 1984

[51] Int. Cl.⁴ ............................................. C03B 23/217
[52] U.S. Cl. .......................................... 65/36; 65/108; 65/120
[58] Field of Search ................. 65/284, 108, 270, 120, 65/271, 252, 36, 40, 65, 113

[56] References Cited

U.S. PATENT DOCUMENTS 2,725,678 12/1955 Weingarten ............................ 65/155
2,883,797 4/1959 Eldred ................................... 65/284

FOREIGN PATENT DOCUMENTS 670411 4/1952 United Kingdom .................... 65/36

Primary Examiner—Arthur Kellogg
Attorney, Agent, or Firm—E. M. Whitacre; D. H. Irlbeck; T. H. Magee

[57] ABSTRACT

The method for sealing a glass stem wafer into the neck of a CRT has a plurality of burner tips disposed completely around the neck. The burner tips are angled such as to create rotating hot gases around the neck. This eliminates the need to rotate the CRT bulb, the wafer or the burner tips, to achieve a uniform seal.

2 Claims, 2 Drawing Figures

METHOD FOR HEAT SEALING A GUN MOUNT IN A CRT NECK

BACKGROUND OF THE INVENTION

The present invention relates to an apparatus for heating an object having a circular cross-section, and more particularly to such an apparatus for heating a CRT (cathode ray tube) neck and sealing a glass stem wafer or electron gun mount therein.

A CRT comprises three major glass sections, namely a panel, a funnel, and a neck. The neck comprises at its end remote from the panel an electron gun that is mounted on a glass wafer with lead wires for the gun electrodes projecting through the wafer.

During manufacture, the CRT is held in the vertical panel-up position of a "carrousel" and the wafer with the gun mounted thereon is upwardly inserted into the neck by a mount pin or socket. Heat from burners is then applied to the outside of the neck proximate the wafer, i.e. at the "seal plane", and the CRT and the wafer are rotated as they are indexed to various stationary fire positions around the carrousel. The fires are positioned around the vertical central axis of the CRT neck so that the neck softens, thins, and then seals to the wafer. Also, excess neck material that is lower than the wafer (cullet) is cut off and therefore falls away from the neck.

Presently, there is a trend towards larger CRTs. This means that the carrousel and the rotating machinery, including two vertical support bars for the CRT, must be relatively large and heavy, and therefore expensive. Further, the two vertical bars interfere with the placement of an electrical resistance oven around the CRT neck for a preferred preheat step before the wafer sealing operation and an annealing step after sealing. Thus additional burners are required to perform these steps instead of the resistance oven. This requires additional carrousel positions and the heating provided by the burners is not as uniform as that provided by the resistance oven. The present invention overcomes the above problems.

SUMMARY OF THE INVENTION

Apparatus, in accordance with the invention, for heating a non-rotating hollow object having a circular cross-section and for sealing a wafer therein comprises a plurality of non-rotating burner nozzles disposed completely around the periphery of the object non-radially with respect to the circular cross-section. A method, in accordance with the invention, comprises substantially uniformly heating completely around the object approximately in the plane of the wafer by creating a rotating hot gas flow around the object without rotating said object or burners.

DETAILED DESCRIPTION

Figure 2:
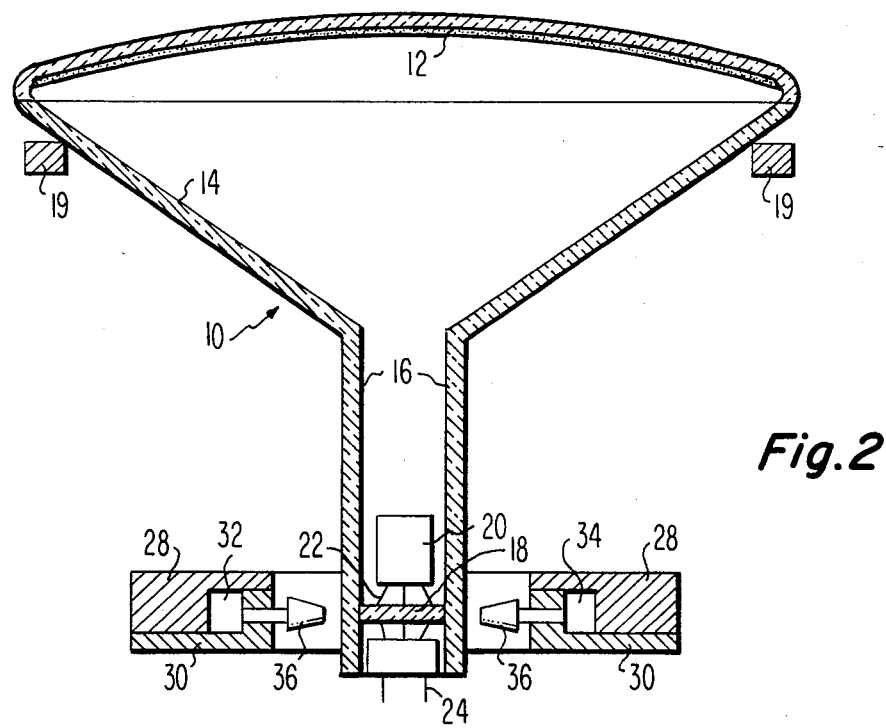
FIG. 2 is a cross-sectional view taken along line 2—2 of FIG. 1.

FIG. 2 best shows a CRT bulb 10 comprising a panel 12 sealed to a funnel 14, which in turn is attached to a neck 16. The CRT bulb 10 is held by a cradle 19, which as explained below need not be capable of rotary motion. In the neck 16 is disposed at the seal plane an electron gun mount or wafer 18 that supports an electron gun 20 by way of lead wires 22. A mount pin 24 supports the wafer 18.

Figure 1:
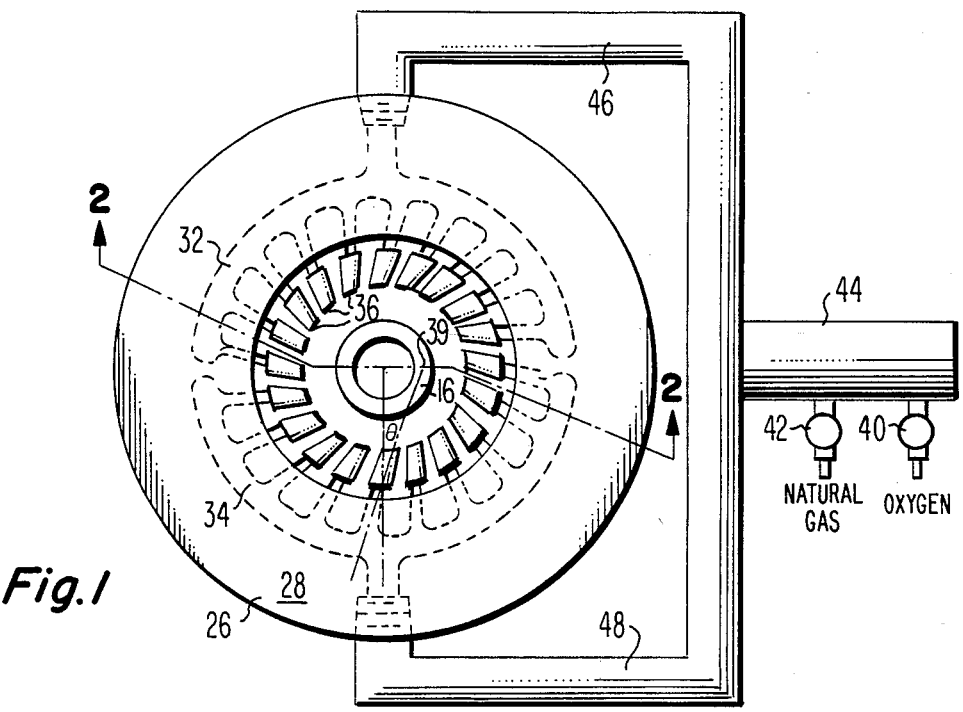
FIG. 1 is a top view of a heat sealing apparatus.

As shown in both FIGS. 1 and 2, a novel heat sealing apparatus comprises a metal manifold 26 having an L-shaped top plate 28 and an L-shaped bottom plate 30, which are sealed together with a sodium silicate cement. Two chambers 32 and 34 are defined by the plates 28 and 30. A plurality of burner tips 36, such as burner No. P-1 manufactured by J & P Machine and Tool Co., Clifton, N.J., communicate with one or the other of the chambers 32 or 34. In the embodiment of FIGS. 1 and 2, twenty burner tips 36 are shown but another number of such burners can be used. The burner tips 36 are in a non-radial configuration with respect to the circular cross-section of the neck 16, i.e. the center line of the burner tips forms an angle $\theta$ with respect to a radius line from the center of the neck 16. In the particular embodiment shown, which is for a standard size 29 mm outside diameter neck, the angle $\theta$ is 9 degrees and the ends of the burner tips are 7 mm from the neck periphery. In general, the burner tips 36 are aimed at the halfway point 39 between the outside diameter of the neck 16 and the outside diameter of the wafer 18. This is a compromise angle between the optimum angle for softening the neck 16, which would place the flames from the burner tips 36 at the outside diameter of the neck 16, and the optimum angle for cutting off and sealing the neck 16, which would place the flames at the outside diameter of the wafer 18.

Two pipes 40 and 42 respectively receive oxygen and a fuel, such as natural gas, and apply these gases to a gas premixing manifold 44. The combustible gas mixture from the manifold 44 is applied by a pipe 46 to the chamber 32 and by a pipe 48 to the chamber 34. The use of a single manifold 44 and the dual feed provided by the indentical in length and inside diameter pipes 46 and 48 and the chambers 32 and 34 results in a uniform temperature distribution around the neck 16.

In operation, the burner tips 36 are initially lower than the seal plane and a "clamshell" type electrical resistance oven (not shown) is brought to a temperature of 550° C., which is above the strain point for the particular neck glass used. The oven is then placed around the neck 16 for approximately 200 seconds for the preheating step. This can be done since the present invention allows support of the CRT 10 by the cradle 19 without any vertical bars near the neck 16 that would interfere with the placement of such an oven. This type of oven, in contradistinction to flame preheating, is easy to position and control and provides heat over a large area, thereby minimizing strain in the glass during the preheating step. Also, oxidation of the socket pins 24 is reduced.

Then the oven is withdrawn and the manifold 26 is raised so that the burner tips 36 are slightly above the seal plane. The burner tips 36 receive a combustible gas mixture, which is ignited to provide a temperature at the neck 16 in excess of 630° C., which is the softening point of the neck glass. Due to the angle $\theta$, hot gas rotates around the neck 16 so that uniform heating of the neck 16 results. This eliminates the need for any rotation or back and forth oscillatory motion of the CRT 10 to provide uniform heating of the neck 16. In general, the combustible gas flow rate must be sufficient to provide the hot gas rotation, but not too great to avoid turbulent flow, which does not produce the gas rotation. The exact values of gas flow rate and pressure depend upon the energy content of the natural gas, orifice diameter of the burner tips 36, the angle θ, and the distance of the burner tips 36 from the neck 16. The neck 16 softens due to the hot gases and "necks-in" (becomes thinner and moves towards the wafer 18). Cullet (the excess neck material below the seal plane) beings to drop.

The manifold 26 and the burner tips 36 then are lowered to a position slightly below the seal plane. The oxygen flow rate is increased so that the temperature at the neck 16 is raised above 975° C. (the melting point of the neck and wafer glass) so that the cullet is quickly cut off. Surface tension draws the thinned neck up and around the stem button.

The burners 36 next are raised to the seal plane and the temperature at the seal plane is maintained at about 975° C. The neck glass and the wafer glass flow together to seal the neck 16 to the wafer 18.

Thereafter, the entire burner assembly is lowered and the glass temperature at the seal plane begins falling. the clamshell oven is re-positioned over the neck 16 for 50 seconds for an annealing step, which begins at about 600° C. due to the falling seal plane temperature, but gradually lowers to 525° C. due to a redistribution of heat in the neck 16. The oven then can be removed and the neck 16 placed in an insulated chamber (not shown) for further cooling. This results in a relatively strain free neck-to-wafer seal despite the fact that the oven is removed before the glass goes below its strain point temperature because of the redistribution of heat through the neck 16 by the oven.

Thus the entire mount-sealing operation is done in a single stationary position, and therefore no carrousel or rotating mechanism is needed.

It will be appreciated that there may be many other embodiments within the spirit and scope of the invention. For example, other temperatures than those given may be used in accordance with the type of glass used. Other types of seals can be performed, such as on camera tubes, gas lasers, splicing glass, etc.

What is claimed is:

1. Method for heating a non-rotating neck of a cathode-ray tube having a circular cross-section and for sealing a wafer therein, said method comprising substantially uniformly heating completely around said neck approximately in the plane of said wafer by providing a rotating flow of hot gases around said neck from a plurality of burner tips similarly aimed nonradially with respect to said circular cross-section along directions tangent to points substantially halfway between the outside diameters of said neck and said wafer, said providing step comprising the steps of:

firstly, providing said hot gases slightly above the plane of said wafer to cause a reduction in diameter of said neck;

secondly, providing said hot gases slightly below the plane of said wafer to cut off excess material from said neck; and thirdly, thereafter providing said hot gases in the plane of said wafer to seal said neck and said wafer together.

2. Method as claimed in claim 1, further comprising preheating said object.

* * * * *